United States Patent [19]

Raphael et al.

[11] 4,322,461
[45] Mar. 30, 1982

[54] ID CARD LAMINAR STRUCTURES AND A METHOD FOR PREPARATION THEREOF USING A TRANSFERED ADHESIVE

[75] Inventors: Thomas Raphael, Winchester; Joseph Shulman, Hyde Park, both of Mass.

[73] Assignee: Polaroid Corporation, Cambridge, Mass.

[21] Appl. No.: 110,324

[22] Filed: Jan. 7, 1980

[51] Int. Cl.³ .............................. B32B 7/14; C09J 7/02
[52] U.S. Cl. ......................................... 428/14; 40/2.2; 156/235; 156/291; 156/307; 156/306.6; 428/195; 428/202; 428/203; 428/424.4; 428/424.6; 428/509; 428/510; 428/518; 428/520
[58] Field of Search ............... 428/509, 510, 518, 520, 428/40, 195, 202, 203, 14, 424.4, 424.6; 156/235, 291, 307; 40/2.2

[56] References Cited

U.S. PATENT DOCUMENTS

| | | |
|---|---|---|
| 3,498,788 | 3/1970 | Hass . |
| 3,511,655 | 5/1970 | Hass et al. |
| 3,581,416 | 6/1971 | Andrews . |
| 3,581,417 | 6/1971 | Andrews et al. |
| 3,582,439 | 6/1971 | Thomas ................................ 40/2.2 |
| 3,614,839 | 10/1971 | Thomas . |
| 3,644,116 | 2/1972 | Andrews et al. |
| 3,647,442 | 3/1972 | Malster . |
| 4,101,701 | 7/1978 | Gordon . |
| 4,115,618 | 9/1978 | MacLeish et al. |

*Primary Examiner*—James C. Cannon
*Attorney, Agent, or Firm*—Louis G. Xiarhos; Robert J. Feltovic

[57] ABSTRACT

Laminar structures comprising a color diffusion transfer photographic print bonded to a vinyl sheet using an adhesive mixture of a vinyl acetate-ethylene copolymer and a hydroxylated polymer, and a method for preparation thereof using an adhesive-supporting carrier sheet.

26 Claims, 4 Drawing Figures

ID CARD LAMINAR STRUCTURES AND A METHOD FOR PREPARATION THEREOF USING A TRANSFERED ADHESIVE

Identification (ID) cards, including a color photograph of the bearer sealed with a protective overlay or in a protective pouch, are commercial items well known in the art. While a wide variety of structures have been utilized to provide such an ID card, one commonly sought feature of these structures is to achieve a card providing a "security seal" between the image surface of the photograph and the inner surface of the protective sheet bonded to it. A security seal is evidenced by destruction of or removal of the image surface of the photograph upon an attempt to separate the protective sheet from the photograph. Such a seal is necessary to offer assurance that the identification information carried by the card has not been tampered with or altered.

A favored structure for fully protecting the front and rear of an ID card is to seal it in an envelope-type pouch. This typically would be accomplished by providing a pouch including front and back protective sheet members sealed along a portion of the periphery and having an open portion adapted to receive the photograph-bearing element. Following insertion of the ID document, the remaining open side or sides are then sealed preferably by heat sealing. A preferred heat-sealable material is rigid or semi-rigid vinyl, e.g., the polyvinyl chloride or polyvinyl chloride-polyvinyl acetate copolymers known in the art. Such a vinyl pouch structure is illustrated, for example, in U.S. Pat. No. 3,949,501, issued to Andrews et al.

Many existing ID card systems are based on cards or documents comprising color photographs from diffusion transfer photographic film units. Such diffusion transfer photographs usually contain a photograph of the bearer together with photographic information relating to him or her. Diffusion transfer photographs are extensively used in ID card issuance systems where the intended bearer of the ID card presents himself or herself at an ID card issuance station where appropriate photographic materials and equipment are assembled. A data card containing information relating to the bearer is prepared and the bearer and data card are photographed simultaneously with a camera containing diffusion transfer photographic film. After processing, a transfer print (the card or document) is provided which comprises a suitable support carrying an image-bearing layer containing a photograph of the bearer and a photographic reproduction of the information on the data card. The image-bearing layer of the print is then laminated to a protective plastic sheet material and, most often, the transfer print is laminated between two plastic sheets to provide the finished ID card. Commonly, if lamination equipment is not available for "on-the-spot issuance" utility, multiple prints are collected and shipped to a central lamination site.

Diffusion transfer photograhic film units so employed are commercially available from Polaroid Corporation under the trademark designation Polacolor 2. Essentially, such film units comprise a photosensitive element that can provide an image-wise distribution of diffusable image dye-providing materials, after exposure and after application of a processing composition between the photoexposed element and a superposed image-receiving element. Once development is complete, the photosensitive element and image-receiving element are peeled apart and the image is viewed in the image-receiving layer of the image-receiving element.

As defined above, a security seal is achieved when there exists a strong enough bond between the vinyl protective sheet and the image-receiving layer of the photograph, so that all or a substantial portion of the image will be removed upon an attempt to separate the vinyl protective sheet from the photograph. Achievement of a successful security seal depends on a variety of factors in combination with the actual degree of adhesion between the vinyl protective sheet and the image-receiving layer. The degree of adhesion required between the vinyl protective sheet and the image-receiving layer, in order to achieve a security seal, is determined by the nature of the underlying layers of the image-receiving element. The resulting bond between one or more of the underlying layers must be weaker than the bond between the vinyl sheet and the image-receiving layer, so that the image will be removed with the protective sheet upon any attempt to separate this sheet from the photograph.

Image-receiving elements employed in diffusion transfer processes typically comprise a plurality of layers coated on one surface of a support. In addition to the image-receiving layer, the image-receiving element may further comprise a polymeric acid layer and a spacer or time-modulating layer, as well as an overcoat stripping layer, for example, as is further described in U.S. Pat. No. 4,009,031 to Carlson et al.

The image-receiving element used in these processes generally comprises an opaque or transparent support coated with an image-receiving layer of a dyeable material which is permeable to the alkaline processing composition. The dyeable material may comprise polyvinyl alcohol together with a polyvinyl pyridine polymer such as a poly-4-vinyl pyridine polymer. Such image-receiving elements are further described in U.S. Pat. No. 3,148,061 issued to Howard C. Haas.

In Polacolor 2 film, the image-receiving layer comprises a mixture of polyvinyl alcohol and poly-4-vinyl pyridine. Insofar as the achievement of a security seal is concerned, the image-receiving layer of Polacolor 2 photographic prints additionally includes on its surface a residue of a stripping layer which was used to facilitate peeling apart the photosensitive element from the image-receiving element. This stripping layer comprises a coating of a solution of ammonia and a hydrophilic colloid (usually gum arabic).

The support for the image-receiving layer may comprise any suitable material including conventional rigid or flexible materials such as paper, resin-coated papers, and polymeric films of both synthetic types and those derived from naturally occurring products. Such materials include paper; polyolefin-coated papers such as polyethylene and polypropylene-coated papers; polymethacrylic acid, methyl and ethyl esters; vinyl chloride polymers, polyvinyl acetal; polymeric resins such as polyethylene; polyamides such as nylon; polyesters such as polymeric films derived from ethylene glycol terephthalic acid; and cellulose derivatives such as cellulose acetate, triacetate, nitrate, propionate, butyrate, acetate-propionate, or acetate-butyrate.

As disclosed in, for example, U.S. Pat. No. 3,362,819, the polymeric acid neutralizing layer may comprise a nondiffusible acid-reacting reagent adapted to lower the pH from a first (high) pH of the processing composition to a predetermined second (lower) pH. The acid-reacting reagents are preferably polymers which contain acid groups, e.g., carboxylic acid and sulfonic acid groups which are capable of forming salts with alkali metals or with organic bases or potentially acid-yielding groups such as anhydrides or lactones. Preferably the acid polymer contains free carboxyl groups. As examples of useful neutralizing layers, in addition to those disclosed in the aforementioned U.S. Pat. No. 3,362,819, mention may be made of those disclosed in the following U.S. Patents: Bedell U.S. Pat. No. 3,765,885; Sahatjian et al. U.S. Pat. No. 3,819,371; Haas U.S. Pat. No. 3,833,367; Taylor U.S. Pat. No. 3,754,910 and Schlein U.S. Pat. No. 3,756,815.

A spacer or time modulating layer may be and is preferably disposed between the polymeric acid layer and the image-receiving layer in order to control the pH reduction so that it is not premature and hence will not interfere with the development process, e.g., to "time" control the pH reduction. Suitable spacer or "timer" layers for this purpose are described with particularity in U.S. Pat. No. 3,362,819 and in others, including U.S. Pat. Nos. 3,419,389; 3,421,893; 3,433,633; 3,455,686; 3,575,701; 3,785,815 and 3,856,522.

It has now been discovered that security-sealed laminar structures comprising a vinyl protective sheet and a color diffusion transfer photographic print can be accomplished through employment of a select adhesive composition. According to the present invention, a layer of an adhesive mixture comprising a vinyl acetate/ethylene copolymer and a hydroxylated polymer is applied between a vinyl protective sheet and a moist image-receiving surface of a color diffusion transfer photographic print. This mixture offers an adhesive that features both water-activation for bonding to moist photographic prints and heat activation for vinyl adhesion.

The adhesive of the present invention is a mixture of a vinyl acetate/ethylene copolymer and a hydroxylated polymer. Suitable commercially available vinyl acetate/ethylene copolymers include the trademarked products—Airflex A-400, Airflex A-401 and Airflex A-402, which can be obtained from Airco Chemical Company. The vinyl acetate/ethylene molar ratios of these products are 80/20, 70/30 and 50/50 respectively. A copolymer with a vinyl acetate/ethylene ratio of about 50/50 is particularly preferred.

To form the adhesive mixture of the present invention, the vinyl acetate/ethylene copolymer is mixed with a hydroxylated polymer, such as a polyvinyl alcohol, a hydrolyzed polyvinyl acetate, or a hydrolyzed cellulose ester. Generally, a copolymer/hydroxylated polymer weight ratio of about 85/15 to about 95/5 is preferred. The most preferred ratio is about 90/10. Preferably, the hydroxylated polymer is a polyvinyl alcohol produced by hydrolyzing a polyvinyl acetate to convert more than about 85 percent of the polymeric units to polyvinyl alcohol. Most preferably, a polyvinyl alcohol is used wherein about 99 percent of the polyvinyl acetate units have been hydrolyzed to polyvinyl alcohol. Suitable commercial hydrolated polymers are available under the trademarks Elvanol 90-50, from E. I. duPont de Nemours & Co., Inc., and Gelvatol 1-90, from Monsanto Chemical Co.

Use of the present adhesive mixture accomplishes a security seal between a vinyl sheet and the image-receiving layer of a color diffusion transfer photographic print. The most common support materials employed in the image-receiving elements of such film are layers comprising baryta paper or polyethylene-clad paper. The weakest bond in a Polacolor 2 print based on a support of baryta paper appears to be in the paper support itself. Baryta paper actually is a paper base coated with a layer or layers of baryta ($BaSO_4$). Baryta paper, such as used in Polacolor 2 film, comprises a 5.0 mil paper stock coated with two layers of $BaSO_4$ to a total thickness of 0.5 mil. When designing an adhesive to bond a vinyl sheet to the image-receiving layer, the degree of adhesion must be sufficiently strong so that upon attempted removal of the vinyl sheet, the paper support tears and the image is removed with the vinyl. However, using film consisting of the identical Polacolor 2 image-receiving element layers, but based on a polyethylene-clad paper support, a stronger degree of adhesion is required between the vinyl and the image-receiving layer. Polyethylene-clad paper, such as is used in Polacolor 2 film, comprises a 5.0 mil thick, high strength paper base coated on both sides with white-pigmented polyethylene having a thickness of 2.0 mil. This polyethylene-clad support does not readily tear and the bonds between the other image-receiving element layers are relatively strong; accordingly, the vinyl has an increased tendency to separate from the image-receiving layer upon attempted removal. In such structures where the nature of the underlying image-receiving element layers dictate that additional bonding strength is desirable, it has been discovered, according to the present invention, that a polyester tie coat can be advantageously employed between the vinyl sheet and the adhesive mixture. This tie coat comprises a heat-activatable polyester adhesive material; suitable commercial products are available from Goodyear Rubber Company under the trademark Vitel, from E. I. duPont de Nemours & Co., Inc. under the numerical designations 46950, 46960, 46971, 46924 and 46944, and from Bostik Division of United Shoe Machinery, Inc. under the numerical designation 7964. Particularly preferred is the Bostik Polyester Adhesive No. 7964, which is a polyester-blocked isocyanate adhesive composition.

The vinyl acetate/ethylene copolymer-hydroxylated polymer adhesive mixture may be applied in a variety of manners and its actual method of introduction between the respective members to be bonded is not critical. In one method, the adhesive mixture is applied as a layer to one surface of the vinyl sheet and the resulting bonding surface is employed in accomplishing a lamination by pressing the moist image-bearing surface of a color print against the bonding surface. After allowing sufficient time for the bonded print to dry, the laminar assembly is heat laminated to form a secure seal.

It is common practice in the art of ID preparation first to produce diffusion transfer prints and then to apply carrier sheets to the moist prints to protect them during transit to a remote lamination site. In coordination with and to take advantage of this established routine, an adhesive-supporting carrier sheet is provided, according to the present invention. This accommodates application of the moisture activated adhesive mixture to the print while still moist, so as to effect bonding to the image surface without requiring an additional rewetting step at the lamination site. In this method, according to the present invention, the adhesive mixture first is applied to a suitable carrier sheet member to form a peelable bond therewith. This adhesive-supporting carrier sheet structure then is used at the site where the diffusion transfer photograph is produced. The moist image-bearing surface of the developed print is pressed against the adhesive-supporting surface of the carrier sheet; the adhesive mixture is water-activatable so that a firm bond to the photograph can be effected by pressing the moist print against the adhesive. Accordingly, individual photographs can be protected so that multiple photographs can be readily shipped from the photography site to a remote lamination site without any danger of the photographs being damaged by sticking to one another.

Once at the lamination site, the carrier sheet is peeled away from the print; the adhesive layer, firmly bonded to the print, remains intact on the image-receiving layer of the print. Generally, shipment time between the photograhic production site and the lamination site is adequate to accommodate sufficient drying of the adhesive mixture/photographic print bond to permit delamination of the carrier sheet while leaving the adhesive mixture intact on the print. A drying period of about 24 hours has been found suitable. If quicker bonding time is required or desirable, a plasticizer can be added to the adhesive mixture to promote wet adhesion to the image surface of the print. This plasticizer additive should be nonvolatile and water soluble or miscible. Suitable plasticizers include ethylene glycol, diethylene glycol, triethylene glycol, propylene glycol, hexylene glycol, pentanediol and the like. Hexylene glycol has been found to provide favorable results and is the preferred plasticizer.

After removal of the carrier sheet, a vinyl protective sheet then is applied to the adhesive surface, or, preferably, the adhesive-bearing print is inserted into a vinyl pouch structure. In addition to its water-activatable characteristics, the adhesive mixture also is heat activatable. The resulting laminar structure is heat-laminated to form a security seal between the protective vinyl sheet and the image-surface of the print. In a most preferred embodiment, a vinyl pouch is employed having slightly greater dimensions than that of the inserted print, so that the peripheral edges of the front and rear vinyl sheet members can be heat-sealed together during the lamination procedure. In order to provide a bond between the rear of the photographic print and a rear vinyl member, it is preferred to employ a coating of an acrylic copolymer such as an ethylene/acrylic acid copolymer or an ethylene/ethyl acrylate copolymer on the inner surface of the rear vinyl member.

In applications where a polyester tie coat is desirable in order to provide additional bonding strength, this tie coat conveniently may be preapplied to the vinyl sheet or, in the most preferred embodiment, to the inside surface of the front member of a vinyl pouch.

The carrier sheet itself may be any sheet material which offers a surface with sufficient adhesion to support a layer of the adhesive mixture, but with low enough adhesive attraction to the adhesive mixture so that it is able to release the adhesive layer intact to the photographic print when it is desired to peel the carrier away and prepare the adhesive-bearing print for security lamination. Suitable carrier sheets include materials such as polyethylene, polyester, cellulose derivatives or release-treated paper sheets which have release coats such as silicone. Cellulose ester derivatives, in particular cellulose triacetate sheet materials, have been found to provide favorable carrier sheet properties.

The invention may be further understood by reference to the figures in which.

Figure 1:
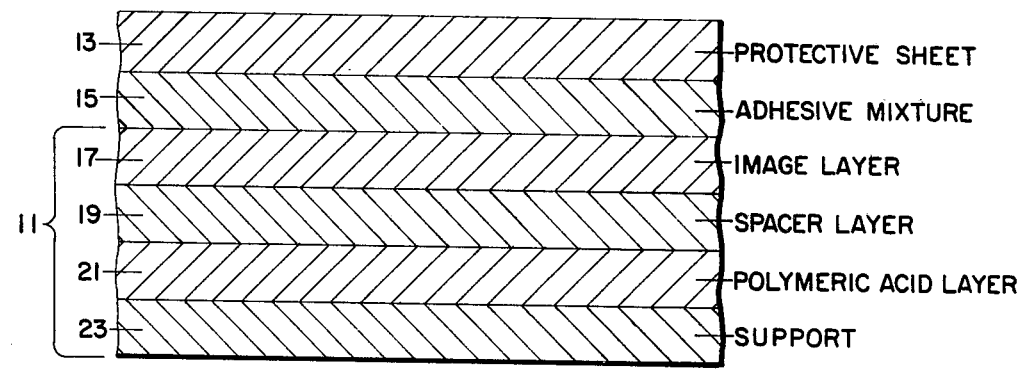
FIG. 1 is a magnified sectional view of a security-sealed laminar structure according to the invention.

A basic embodiment of the invention is a laminar structure as illustrated in FIG. 1. The laminar structure comprises a color photographic print 11 which is the image-receiving element of a color diffusion transfer film unit. In diffusion transfer color film, the image-receiving element typically comprises an image layer 17, a spacer layer 19, and a polymeric acid layer 21 coated on a support 23. The image layer 17 of the color print is bonded to a layer of adhesive mixture 15, a mixture of a vinyl acetate/ethylene copolymer and a hydroxylated polymer, which, in turn, is bonded to a vinyl protective sheet 13. Sheet 3 is rigid or semirigid and together with support 23 provides the requisite strength and stiffness to maintain the shape of the card and prevent damage due to everyday handling. For added durability, an additional sheet of vinyl can be bonded to the back of the photographic print 11, the exposed surface of support 23, to form a sandwich structure of the color print between two sheets of vinyl.

Figure 2:
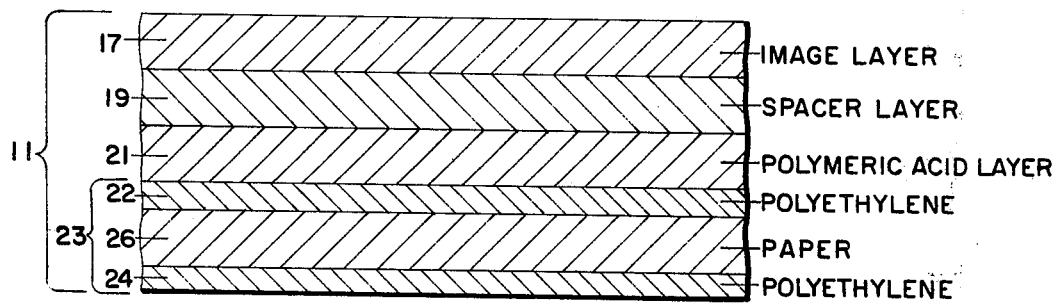
FIG. 2 is a magnified sectional view of an image-receiving element based on a polyethylene-clad paper support.
Figure 3:
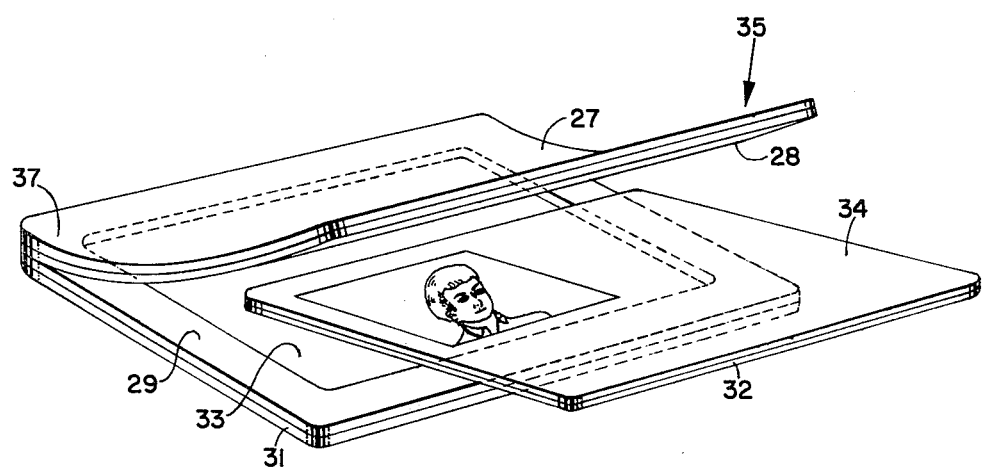
FIG. 3 is a perspective view of a vinyl protective pouch employed in one embodiment of the invention.

Another preferred means for fully encasing a color diffusion transfer print is depicted in FIG. 3. As shown in this illustration, pouch 35 comprises a vinyl cover sheet 27, a vinyl back sheet 31, and a vinyl frame 29 which defines a recess or well 33. The frame member 29 is fully prebonded to back sheet 31; the cover sheet 27 is prewelded along only one of its edges 37 in order to permit opening the pouch to a position such as that shown in FIG. 3. In this position, the pouch is set to accommodate insertion of a diffusion transfer print 32 into recess 33. In a preferred embodiment, photographic print 32 includes a layer 34 of the adhesive mixture, according to the present invention, on its frontal surface (alternatively, the inner surface of the vinyl cover sheet can include a coating of the adhesive mixture). Also, the exposed surface of back sheet 31 within recess 33 preferably is provided with a layer of a heat activatable adhesive to accomplish bonding to the back side of the photographic print. In a preferred embodiment wherein the photographic print is an image-receiving element based on a polyethylene support (FIG. 2), the inner surface of vinyl cover sheet 27 includes a layer of a tie coat 28. After insertion of the print, the pouch is closed by pressing the cover sheet 27 into superposition with frame 29. The entire laminar assembly then is sealed by heat lamination. The heat lamination accomplishes sealing of the vinyl cover sheet 27 to the peripheral edges of vinyl spacer 29 and also achieves a security seal between the image layer of the photographic print and the vinyl cover sheet through the heat activatable adhesive mixture.

FIG. 2 illustrates an image-receiving element of a color diffusion transfer film unit, based on a support of a polyethylene-clad paper 23. This support structure comprises a high strength paper sheet 26 clad on both sides by layers of polyethylene 22 and 24.

Figure 4:
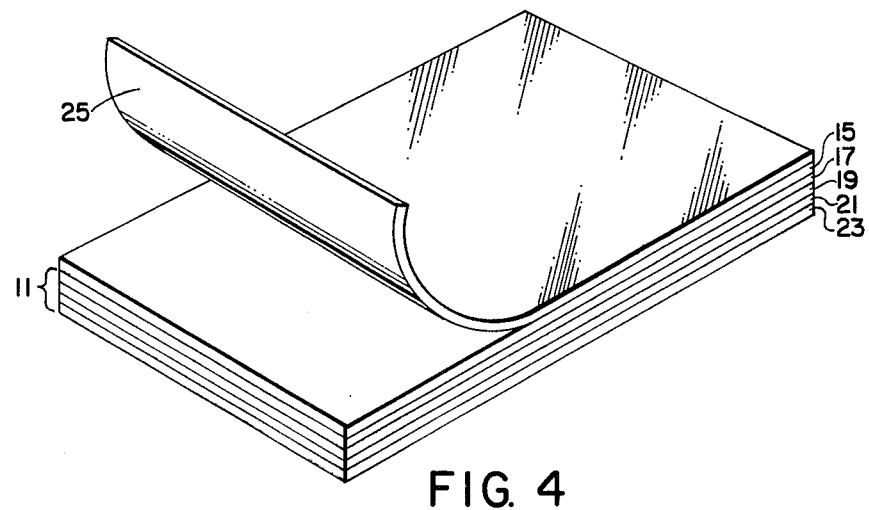
FIG. 4 is a magnified perspective view of a laminar structure including a removable carrier sheet, according to one embodiment of the invention.

FIG. 4 shows a laminar structure prepared according to a preferred embodiment of the present invention. The laminar structure comprises a diffusion transfer color print 11, the image-receiving element of a diffusion transfer photographic film unit. This image-receiving element includes a plurality of layers—the image layer 17, spacer layer 19 and polymeric acid layer 21 based on support 23. The surface of the image layer 17 is bonded to the select adhesive mixture 15, according to the present invention. This adhesive is a mixture of a vinyl acetate/ethylene copolymer and a hydroxylated polymer. The adhesive layer in turn is peelably bonded to carrier sheet 25. As depicted in FIG. 4, carrier sheet 25 can readily be peeled apart from the laminar assembly leaving adhesive layer 15 intact over the image layer of the color print. Such a structure can be achieved by pressing the moist image layer 17 of a diffusion transfer color print 11 against the adhesive 15 supporting surface of carrier sheet 25. Since the select adhesive mixture is water activatable, a firm bond is formed between the image layer 17 and the adhesive 15. A laminar structure as illustrated in FIG. 4 can conveniently be utilized in protecting a diffusion transfer print at the site where the photograph is produced. This structure can be shipped to a remote lamination site without danger of damage to the print through handling or by sticking to one another. Once at the remote site, carrier sheet 25 can be peeled away, leaving a color print 11 covered by adhesive 15 ready for insertion into a protective pouch, such as shown in FIG. 3, for heat lamination.

The following examples are provided to further illustrate the invention:

EXAMPLE I

An adhesive mixture, according to the present invention, was prepared mixing a vinyl acetate-ethylene copolymer (50/50 molar) with a polyvinyl alcohol in a weight ratio of copolymer/polyvinyl alcohol of 92/8. (The copolymer was obtained from Air Products and Chemicals Co. under the trademark "AIRFLEX A-402" and the polyvinyl alcohol was obtained from Monsanto Chemical Co. under the trademark "GEL-VATOL 1-90.") The mixture was prepared by adding 167.2 g of the copolymer solution (55% solids) slowly and with stirring, into 100 g of the polyvinyl alcohol solution (8% solids—which was previously prepared by stirring the resin powder into cold water and then heating and stirring at 200° F. for 30 minutes.) The resulting mixture was stirred at room temperature for about 15 minutes. After adding 2.5 g of hexylene glycol plasticizer, mixing was then continued for another 5 minutes.

A carrier sheet structure was prepared using a 3.0 mil cellulose triacetate film base (obtained from Tennessee Eastman Chemical Co. under the trademark "KODACEL TA-401"). The above described adhesive mixture was applied to the triacetate with a 2 mil doctor bar and the coated carrier sheet was then dried in a circulating air, gas fired oven at 90° C. for 4 minutes. A dry-coating thickness of about 0.5 to about 0.75 mil was achieved.

A color diffusion transfer photographic print was produced using Polacolor 2 film in a Polaroid ID-3 system. The exposed photosensitive element was pulled from the camera while in superposition with the image-receiving element of the film. After maintaining the elements in superposition for 60 seconds, they were stripped apart. The wet image surface of image-receiving element immediately was laminated to the adhesive mixture supporting surface of the carrier sheet. This carrier sheet print laminar structure was allowed to dry at room temperature for about 24 hours. Once the structure had dried, the triacetate sheet was peeled away leaving the adhesive mixture layer intact over the image surface of the photographic print.

The adhesive coated print (based on a polyethylene-clad paper support) was inserted into a vinyl pouch structure including a layer of a polyester-blocked isocyanate tie coat (obtained from Bostik Division of USM, Inc. under the designation "Polyester Adhesive No. 7964") on the inner surface of the front member of the pouch. The pouch was then sealed in a laminator device including a heated pressure platen at about 70 psi and a temperature of about 350° F. The resultant ID card assembly featured a security seal; attempts to delaminate the front vinyl sheet from the print resulted in destruction of the image.

EXAMPLES II-V

Additional examples were prepared and tested following the same general procedure of Example I. In these examples, however, adhesive mixtures prepared and applied featured copolymer to polyvinyl alcohol ratios varying from 88/12 to 89/2 (Ex. II—88/12, Ex. III—90/10, Ex. IV—94/6, Ex. V—98/2). The adhesive mixtures were prepared with and without hexylene glycol additive. The hexylene glycol-containing adhesive mixtures exhibited a "faster grab" to the wet photographic print (about 3-5 minutes). However, normal handling and shipping procedures provide at least a 24 hour drying period before delamination which makes the feature of faster adhesion not essential in most situations. All of the resulting ID card structures displayed security seals; the adhesives with a ratio of about 90/10 demonstrated the best results (most complete image destruction on attempted delamination of the front vinyl sheet from the image surface of the photograhic print).

EXAMPLE VI

Using the same general procedure as outlined above in Example I, an adhesive mixture (having 90/10 copolymer/polyvinyl alcohol ratio) was prepared and coated onto a 3.0 mil triacetate carrier sheet. A plasticizer was not included in the adhesive formulation.

A color diffusion transfer photographic print was produced using Polacolor 2 film. The resulting moist print (based on a baryta paper support) was laminated to the carrier sheet and this laminar structure was allowed to dry at room temperature for about 24 hours. The triacetate sheet was then peeled away and the adhesive-coated print was inserted into a vinyl pouch (without any tie-coat) and the pouch was sealed in a heat laminator. The resultant card featured a security seal; upon attempted delamination of the vinyl front sheet, paper tear occurred and damage to the print was evident.

EXAMPLES VII and VIII

Using the same general procedure of Example I, two additional examples were prepared and tested. In these preparations, however, the adhesive mixture was prepared using vinyl acetate-ethylene copolymers differing from that used in Example I. Example VII used a vinyl acetate-ethylene copolymer having a molar ratio of 80:20 (obtained from Air Products and Chemicals Co. under the trademark "AIRFLEX A-400"); Example VIII used a vinyl acetate-ethylene copolymer having a molar ratio of 70:30 (obtained from Air Products and Chemicals Co. under the trademark "AIRFLEX A-401"). The copolymer to polyvinyl alcohol ratios both were 90/10.

The ID card structures prepared exhibited security seals; attempts at delamination of the front vinyl sheet from the image surface of the print resulted in readily detectable damage to the image.

The following comparative examples illustrate results obtained using an adhesive consisting of separate layers of the components of the present adhesive mixture.

COMPARATIVE EXAMPLE A

A carrier sheet was prepared using as a base 3.0 mil cellulose triacetate film (obtained from Tennessee Eastman Chemical Co. under the trademark "KODACEL TA-401"). This cellulose triacetate film was coated with a layer of a 50:50 molar vinyl acetate-ethylene copolymer (obtained from Air Products and Chemicals Co. under the trademark "AIRFLEX A-402") to a resulting dry thickness of 0.3–0.6 mil. On top of the dry copolymer was coated a second layer of a polyvinyl alcohol (obtained from Monsanto Chemical Co. under the trademark "GELVATOL 1-90") to an average dry thickness of 0.3 to 0.6 mil.

To produce a color diffusion transfer photographic print, Polarcolor 2 film was inserted into a camera of a Polaroid ID-3 system. A data card was then inserted and the card and subject were simultaneously photographed. The exposed photosensitive element then was pulled from the camera while in superposition with the image-receiving element of the film. After maintaining the elements in superposition for 60 seconds, they were stripped apart. Immediately after peel, the coated surface of the carrier sheet, as prepared above, was laminated to the moist image surface of the print (based on a polyethylene support). The carrier sheet print laminar structure was then dried for 24 hours. Once dried, attempt was made to separate the laminar structure. However, the carrier sheet could not readily be stripped from the structure, as desired. Forced delamination resulted in removal of significant portions of the adhesive from the surface of the print.

COMPARATIVE EXAMPLE B

A second experiment was conducted following the same general procedure as in Comparative Example A, but, in preparing the carrier sheet, the sequence of application of the adhesive layers was reversed. First, the cellulose triacetate film was coated with a layer of the polyvinyl alcohol, followed by a layer of the vinyl acetate-ethylene copolymer. This prepared carrier sheet was then laminated to a moist color diffusion transfer print.

After allowing the laminar structure to dry for 24 hours, separation of the carrier sheet was attempted, as desired. However, the vinyl acetate-ethylene copolymer layer did not bond well to the print and, accordingly, the adhesive layers tended to come away with the carrier sheet rather than remain intact on the image surface of the print.

Use of the adhesive mixture of the present invention achieves a "security seal" between a vinyl protective sheet and a color diffusion photographic print. Even prints based on supports such as polyethylene-clad paper can be security-sealed using an additional polyester tie coat between the protective sheet and the adhesive.

The adhesive mixture also features both water and heat activatable properties which accommodate utility of the adhesive in a unique and advantageous handling procedure. As discussed above, it is common practice to produce the diffusion transfer photographic prints, to be used in ID card preparation, at a location convenient to the subjects to be photographed for identification purposes. These photographic prints then are forwarded to a remote site where a heat lamination device is employed to assemble the finished ID cards. Since freshly produced prints are moist and have a marked tendency to stick to one another, multiple prints must be protected by a peelable carrier sheet which can later be removed before lamination. In a most preferred embodiment of the present invention, the adhesive mixture is peelably bonded to a carrier sheet member which then is employed in the conventional manner. By applying the adhesive to a moist print, a firm bond is effected between the print and the water-activatable adhesive. The carrier sheet functions to protect the print in transit, after which the carrier sheet is peeled away and the adhesive coated print is inserted into a vinyl pouch unit and sealed by heat lamination to produce a "security-sealed" ID card structure.

Certain modifications may be made in details of the above description of the invention without departing from the spirit and scope of the invention defined in the appended claims. Accordingly, it is intended that all matter contained in the above description or shown in the accompanying drawings be interpreted as illustrative and not limiting in nature.

What is claimed is:

1. A laminar structure comprising a carrier sheet material supporting on one surface thereof and peelably releasable therefrom a layer of an adhesive mixture consisting essentially of a vinyl acetate-ethylene copolymer and a hydroxylated polymer.

2. The structure of claim 1 wherein said carrier sheet material is a cellulose ester derivative.

3. The structure of claim 2 wherein said carrier sheet material is cellulose triacetate.

4. The structure of claim 2 wherein said hydroxylated polymer is polyvinyl alcohol.

5. The structure of claim 1 wherein said copolymer has a vinyl acetate/ethylene molar ratio of about 50/50.

6. The structure of claim 1 wherein said adhesive consists essentially of a vinyl acetate-ethylene copolymer/hydroxylated polymer mixture in a weight ratio ranging from about 85/15 to about 95/5.

7. The structure of claim 6 wherein the vinyl acetate-ethylene copolymer/hydroxylated polymer ratio is about 90/10.

8. The structure of claim 5 comprising a carrier sheet of cellulose triacetate releasably bonded to a layer of an adhesive mixture consisting essentially of a vinyl acetate-ethylene copolymer and a polyvinyl alcohol polymer in a weight ratio of about 90/10.

9. A laminar structure comprising a carrier sheet material supporting on one surface thereof and peelably releasable therefrom a layer of an adhesive mixture comprising a vinyl acetate-ethylene copolymer and a hydroxylated polymer, said layer of adhesive in turn bonded to the image-receiving layer of a color diffusion transfer photographic print.

10. The structure of claim 9 wherein said image-receiving layer comprises a mixture of polyvinyl alcohol and poly-4-vinyl pyridine.

11. The structure of claim 9 wherein said carrier sheet material is cellulose triacetate.

12. The structure of claim 9 wherein said hydroxylated polymer is polyvinyl alcohol.

13. The structure of claim 10 wherein the layer of adhesive comprises a mixture of a copolymer having a vinyl acetate/ethylene molar ratio of about 50/50, and a polyvinyl alcohol polymer, said mixture having a copolymer/polymer weight ratio of about 90/10.

14. A laminar structure comprising a transparent layer of a polyvinyl chloride bonded to an adhesive layer consisting essentially of a mixture of a vinyl acetate-ethylene copolymer and a hydroxylated polymer in a weight ratio ranging from about 85/15 to about 95/5, said adhesive layer in turn bonded to the image-receiving layer of a color diffusion transfer photographic print.

15. The laminar structure of claim 14 wherein said adhesive mixture consists essentially of a vinyl acetate-ethylene copolymer and a hydroxylated polymer in a weight ratio of about 90/10.

16. The laminar structure of claim 14 including a polyester tie-coat situated between said polyvinyl chloride and said adhesive layer.

17. The laminar structure of claim 16 wherein said polyester tie-coat is a heat-activatable polyester-blocked isocyanate adhesive composition.

18. The laminar structure of claim 16 wherein said color diffusion transfer photographic print is based on a polyethylene-clad paper support.

19. The laminar structure of claim 14 including a second layer of a polyvinyl chloride bonded to the rear of said photographic print.

20. The laminar structure of claim 18 comprising a front transparent layer of a polyvinyl chloride, the inner surface of which is provided with a tie-coat of a heat activatable polyester-blocked isocyanate adhesive composition; an adhesive layer consisting essentially of a mixture of a vinyl acetate-ethylene copolymer and a polyvinyl alcohol polymer; a polyvinyl chloride spacer layer including a peripheral frame defining a central recess; a color diffusion transfer photographic print having an image-bearing front surface bonded to said adhesive layer, and having dimensions such that it fits within the defined recess of said spacer layer; and a second layer of a polyvinyl chloride bonded to the rear of said photographic print.

21. The structure of claim 20 wherein said adhesive layer consists essentially of a mixture of a vinyl acetate-/ethylene copolymer having a molar ratio of about 50/50 and a polyvinyl alcohol in a mixture weight ratio of copolymer/polyvinyl alcohol of about 90/10.

22. A process for preparing an ID card laminar structure comprising:
 applying to a moist image-receiving layer of a color diffusion transfer photographic print a layer of an adhesive mixture comprising a vinyl acetate-ethylene copolymer and a hydroxylated polymer supported on one surface of a carrier sheet;
 allowing sufficient time for the moist adhesive-photographic print bond to dry and then peeling the carrier sheet from the adhesive mixture to leave an adhesive-coated photographic print structure; and
 positioning a vinyl protective sheet over the adhesive coated print and heat sealing the vinyl sheet to said print structure to form a secure bond thereto.

23. The process of claim 22 wherein said image-receiving layer comprises a mixture of polyvinyl alcohol and poly-4-vinyl pyridine.

24. The process of claim 22 wherein said hydroxylated polymer is polyvinyl alcohol.

25. The process of claim 22 wherein said vinyl acetate-ethylene copolymer has a molar ratio of vinyl acetate/ethylene of about 50/50.

26. The process of claim 22 where said photographic print is based on a polyethylene-clad paper support.

* * * * *